United States Patent [19]

Takenoya et al.

[11] 4,276,840
[45] Jul. 7, 1981

[54] ELECTRONIC SEWING MACHINE WITH A FEED CONTROL DEVICE

[75] Inventors: Hideaki Takenoya, Hachioji; Hachiro Makabe, Fussa, both of Japan

[73] Assignee: Janome Sewing Machine Co., Ltd., Tokyo, Japan

[21] Appl. No.: 47,631

[22] Filed: Jun. 11, 1979

[30] Foreign Application Priority Data

Jun. 14, 1978 [JP] Japan ................................. 53-70772

[51] Int. Cl.³ .......................................... D05B 27/22
[52] U.S. Cl. ............................. 112/315; 112/121.11; 112/158 E
[58] Field of Search .................. 112/158 E, 314, 220, 112/315, 121.12, 319, 121.11; 318/696

[56] References Cited
U.S. PATENT DOCUMENTS

| | | | |
|---|---|---|---|
| 4,059,746 | 11/1977 | Haga | 318/696 X |
| 4,145,643 | 3/1979 | Maeda et al. | 318/696 |
| 4,145,982 | 3/1979 | Kume et al. | 112/158 E |
| 4,167,912 | 9/1979 | Sedlatschek et al. | 112/158 E |
| 4,191,120 | 3/1980 | Bergvall | 318/696 X |

*Primary Examiner*—Peter P. Nerbun
*Attorney, Agent, or Firm*—Michael J. Striker

[57] ABSTRACT

A sewing machine which utilizes a pulse motor to vary feed rate in steps is equipped with a microcomputer that causes the pulse motor to operate in a repeated sequence in which two adjacent feed rates are alternated. By operating the computer in accordance with a manually-operable control, an overall feed rate can be produced which is intermediate the two adjacent feed rates.

3 Claims, 6 Drawing Figures

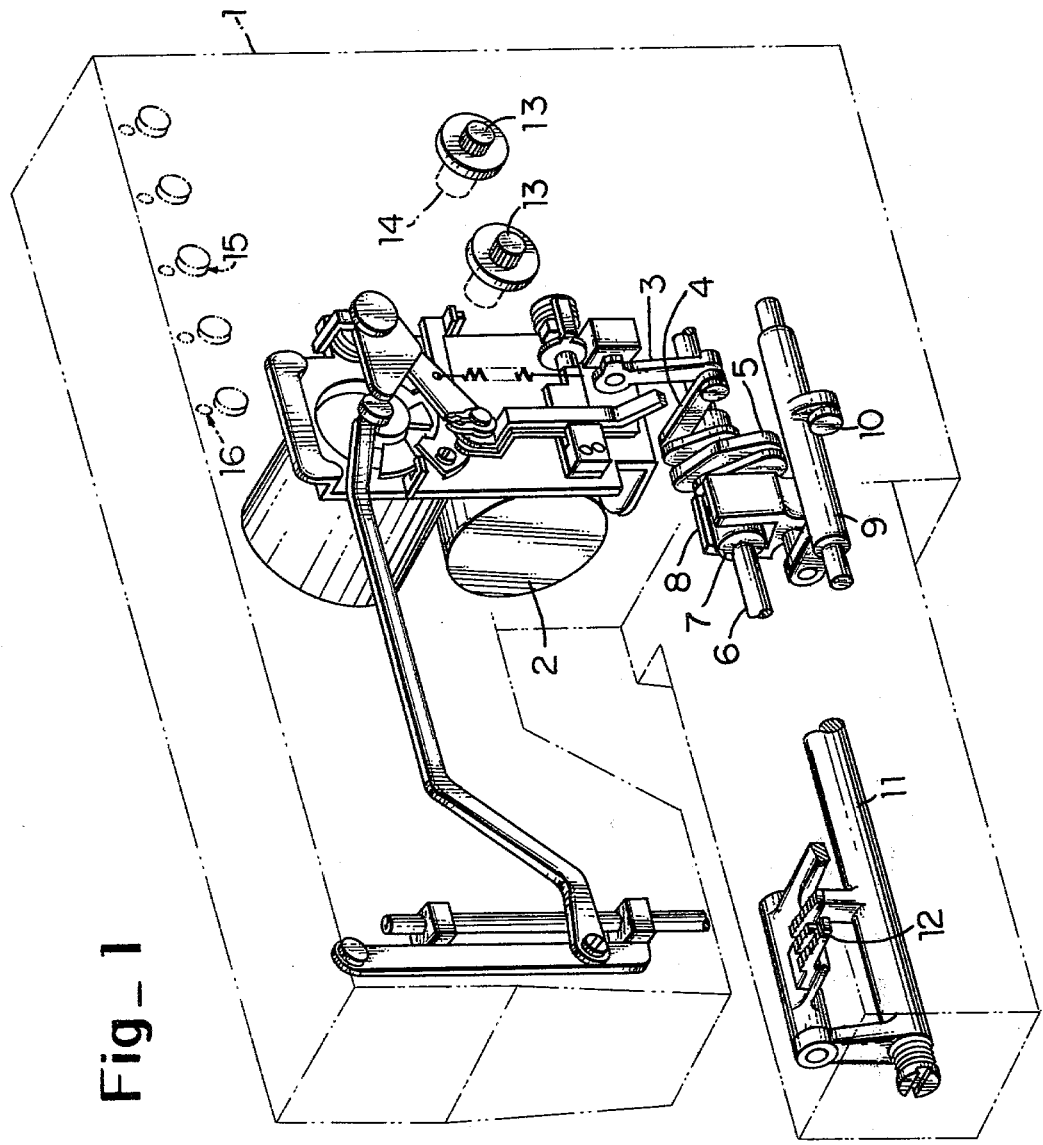
Fig_1

Fig_2
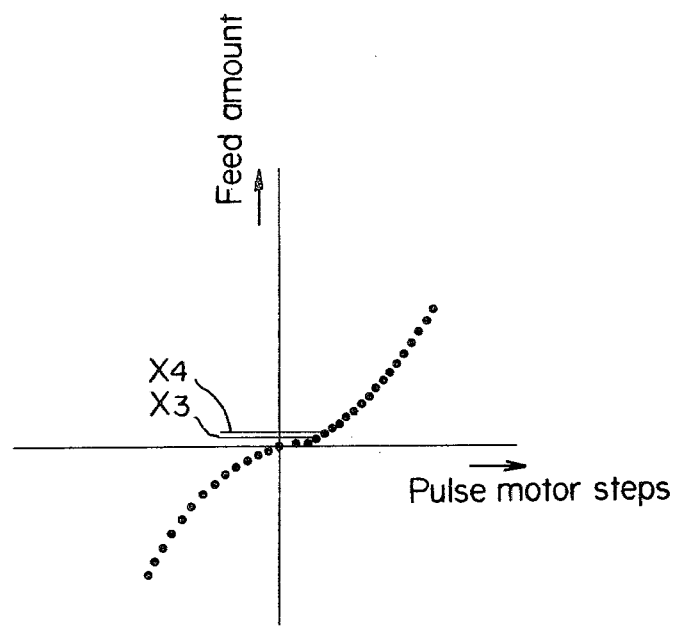
Fig_3
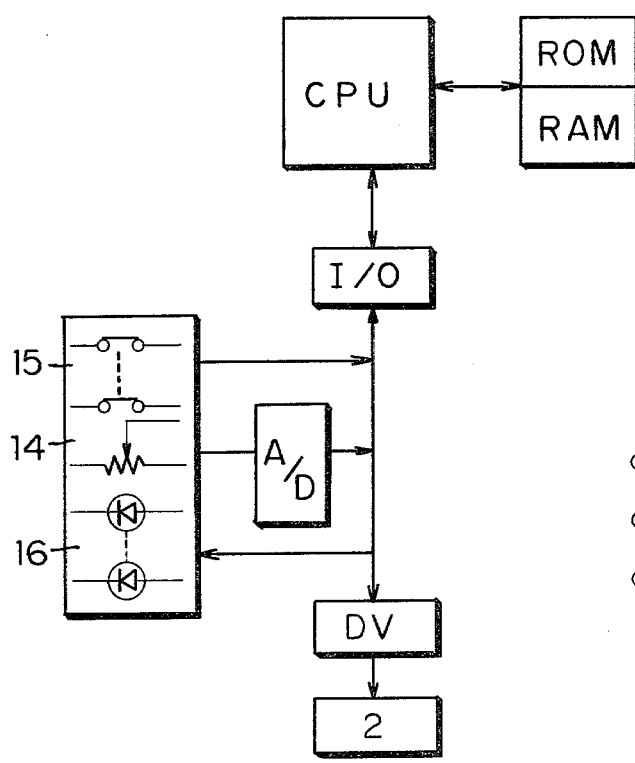
Fig_5
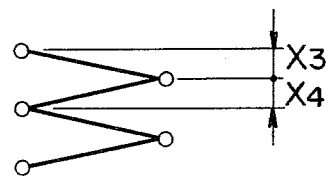

Fig_4

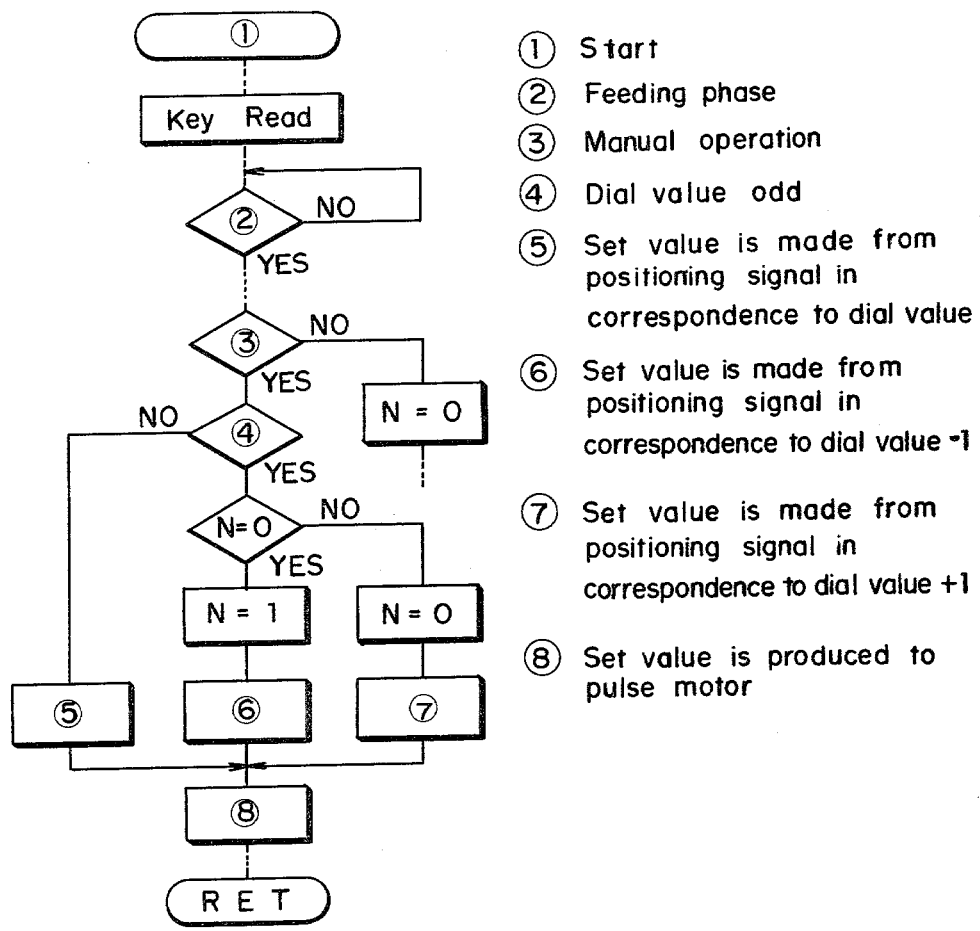

① Start
② Feeding phase
③ Manual operation
④ Dial value odd
⑤ Set value is made from positioning signal in correspondence to dial value
⑥ Set value is made from positioning signal in correspondence to dial value -1
⑦ Set value is made from positioning signal in correspondence to dial value +1
⑧ Set value is produced to pulse motor

Fig_6

| Feed dial values | Position coordinates of pulse motor | Feeding amount |
|---|---|---|
| 0 0 0 0 0 | 0 1 1 1 1 | 0 |
| 0 0 0 0 1 | | |
| 0 0 0 1 0 | 1 0 0 0 0 | X1 |
| 0 0 0 1 1 | | |
| 0 0 1 0 0 | 1 0 0 0 1 | X2 |
| 0 0 1 0 1 | | |
| 0 0 1 1 0 | 1 0 0 1 0 | X3 |
| 0 0 1 1 1 | | |
| 0 1 0 0 0 | 1 0 0 1 1 | X4 |

ELECTRONIC SEWING MACHINE WITH A FEED CONTROL DEVICE

BACKGROUND OF THE INVENTION

A pulse motor is often employed to control the operation of various precision mechanisms because the rotation angle of the pulse motor is accurately determined by the number of input pulses, and the angular position can thus be accurately controlled without the need of a feedback control, thereby reducing cost. However, if the pulse motor is used to control the fabric feeding device of a sewing machine, the resolving precision of the rotation angle of the pulse motor must be considered. When such a pulse motor is utilized, feed amount per pulse varies discontinuously as is shown in FIG. 2, and can only be varied stepwise between two adjacent feed amounts when the pulse motor is pulsed. The rotation angle of the pulse motor is proportional to the number of pulses delivered to the pulse motor. But, as the motion of the pulse motor is transmitted to the feed dog through a linkage and an adjuster, the selected feed amounts vary non-linearly with the number of pulses as shown in FIG. 2. The stitch control follows the plots in FIG. 2 in accordance with by stitch information. However, in dependence upon the type of stitch utilized, it becomes necessary to employ feed amounts intermediate adjacent plots shown in FIG. 2. To do so, the number of steps of the pulse motor required for maximum feed may be increased. This results in increasing the number of rotations of the pulse motor for the maximum feed amount, since the resolving precision of the rotation angle of the pulse motor is fixed. As a result, the rotation inertia of motor increases and its response decreases. Further, the non-linear variation of feed rate unnecessarily increases the resolving precision in the range of the minimum feed in FIG. 2, thereby causing waste in the control of the pulse motor.

SUMMARY OF THE INVENTION

It is a primary object of the invention to increase the resolving precision of a pulse motor, instead of increasing the rotation angles of the pulse motor, to thereby obtain desirable feed rates in sewing machine.

In this invention, this object is achieved by the use of a micro-computer which operates the pulse motor in such a fashion as to cause the pulse motor to alternate between adjacent individual feed rates to produce an overall feed rate which is a composite of the individual feed rates and is, overall, intermediate them. Thus, if a required feed rate is intermediate two available feed rates and the pulse motor can only feed at one rate or the other at any one time, the micro-computer programs the pulse motor to execute a repeated sequence in which the pulse motor operates first at one rate and then at the other. By so operating, the pulse motor feeds both at an overall rate which is a composite of the two rates and is intermediate them.

The other features and advantages of the invention will be apparent from the following description of the invention in reference to the preferred embodiment as shown in the attached drawings.

BRIEF DESCRIPTION OF THE DRAWINGS

FIG. 1 an outline of a sewing machine provided with the invention disclosed herein;

FIG. 2 shows fabric feed amount for each of the steps of the pulse motor;

FIG. 3 is a block diagram of the control for the pulse motor;

FIG. 4 is a flow chart showing the operation of the invention;

FIG. 5 is an example of a stitch produced by the invention; and

FIG. 6 shows the relation between the adjusted values indicated on the dial, the position coordinates of the pulse motor, and feed amounts.

DETAILED DESCRIPTION OF PREFERRED EMBODIMENTS

In FIG. 1, a numeral 1 indicates a sewing machine housing containing a pulse motor for controlling a fabric feeding device, in which the pulse motor acts on a feed adjuster 5 via links 3 and 4. A numeral 6 indicates a lower shaft rotating in synchronism with rotation of an upper shaft (not shown) of the sewing machine, and a fork rod 8 engages a cam 7 fixedly mounted on the lower shaft 6 for controlling the horizontal movement of a feed dog 12. Therefore, the fork rod 8 is shiftable as the lower shaft 6 rotates. As is well known, the feed adjuster 5 is formed with a guide groove (not shown) in which a block is slidably received. The block is connected to fork rod 8. Thus, depending upon the inclination of the feed adjuster 5, the horizontal feeding amount of the feed dog 12 is varied or nullified through transmission links 9, 10, and 11. The inclination of the feed adjuster 5 is adjusted by the operation of the pulse motor 2. Numeral 13 indicates a feed adjusting dial manually operated to adjust the fabric feeding rate, and 14 indicates a variable resistor varied by the dial for converting a rotated position of the dial 14 into a resistance value. A numeral 15 collectively shows pattern selecting switches. The value of the adjusting dial 13 can be adjusted to provide an optimum feed rate specific to the patterns selected. 16 indicates a light emitting diode for indicating the pattern selecting switch which has been selected.

FIG. 3 is a block diagram of a control micro-computer, in which CPU is a central processing unit, ROM is a read only memory, RAM is a read-write memory temporarily storing information, and I/O is an input output port. A/D is an A/D converter which converts the resistance of the variable resistor 14 into a digital value, and DV is a pulse motor driving circuit which receives a control signal from the micro-computer and drives the fabric feed control pulse motor 2. If any one of the pattern selecting switches 15 is operated, its operation is registered in the RAM and calculations are performed in the central processing unit CPU. Subsequently corresponding light emitting diode 16 is lighted, and a pattern signal is simultaneously given to the driving circuit DV for each stitch from a specific data location within the ROM which corresponds to the operated switch, thereby driving the pulse motor 2. The feed adjusting dial 13 (shown in FIG. 1) can be manually rotated. The resultant resistance value of the variable resistor 14 is routed into the memory RAM and is passed into the CPU for determination of the proper stepping of the pulse motor 2 in response to this resistance value, independently of the pattern signals stored in the memory ROM by operation of the pattern selecting switches 15. FIG. 6 shows the values obtained when the adjusted positions of the feed adjusting dial 13 are A/D converted, and the corresponding position coordinates (signals showing the positions for setting the pulse motor) of the pulse motor. The resolving precision of A/D converted values as shown on the adjusting dial 13 is twice the resolving precision of the position co-ordinates of the pulse motor so that the feeding dial 13 indicates the average value between corresponding adjacent position coordinates of the pulse motor. Each of the position co-ordinates of the pulse motor, partially shown in FIG. 6, corresponds a corresponding one of the points plotted in FIG. 2. Thus, each of the feed amounts in FIG. 6 corresponds to one of the feed amounts shown in FIG. 2, and $X_3$ and $X_4$ are particularly shown therein. Thus, feed adjusting dial 13 indicates values identifying midpoints between adjacent points in FIG. 2. In FIG. 6, the feed amount 0 is made to correspond to the position co-ordinate 01111 of the pulse motor because the maximum reverse feeding amount is made to correspond to the position co-ordinate 00000 of the pulse motor.

Operation of the invention will be explained with reference to the flow chart in FIG. 4 in which dotted lines indicate possible omission of steps. Assume that the basic zigzag stitching as shown in FIG. 5 has been selected by one of the pattern selecting switches 15. Subsequently, when the machine operator rotates the feed adjusting dial 13, the sewing machine is so set that the adjusted position or value of the dial overrides the usual feed amount used for such stitches. When the dial 13 is adjusted to an even number, (i.e. when the last bit of the code of the dial value in FIG. 6 is 0) such as 00110, the code corresponds to the position coordinate 10010 of the pulse motor. In this case the basic zigzag stitches are fed by a constant feed amount $X_3$. Subsequently, if the feed adjusting dial 13 is rotated to slightly increase the feed amount and set to the value corresponding to 00111, there is no corresponding position coordinate of the pulse motor. However, in this case, the micro-computer of this invention produces a discriminating signal N which alternates between 0 and 1 at each stitch. If N=1 at the first stitch, the micro-computer is so operated to calculate that the adjusted position or value of the dial 13 is (00111)−1 and to produce a position coordinate 10010 which would ordinarily correspond to the dial value 00110, and the pulse motor 2 is driven to produce feed amount $X_3$. When N=0 at the subsequent stitch, (00111)+1 is calculated to produce a coordinate (01000), and the pulse motor 2 is driven to provide feed amount $X_4$. As a result, zigzag stitches are produced with alternating feed amounts $X_3$ and $X_4$, as is shown in FIG. 5.

In this example, it has been explained that the two feed amounts $X_3$ and $X_4$ are alternately provided in a series of stitches as shown in FIG. 5. However, it will be possible to further increase the resolving precision of the position coordinates of the pulse motor by repeatedly using one step (for example, $X_3$) in two stitches and another step (for example, $X_4$) in one stitch. The resolving precision will furthermore be increased if the pulse motor is so controlled as to execute a combination of three steps, for example, $X_2$, $X_3$, and $X_4$.

Thus, when the pulse motor is pulsed at a constant feed rate, it has a resolving precision which can only be adjusted in steps. On the other hand, if the overall feed amount is a composite of adjacent feed rates, resolution is further increased, and the pulse motor is used more effectively to improve the control of the sewing machine.

We claim:

1. In a sewing machine which utilizes a pulse motor to control feed rates of cloth sewed thereby and in which such feed rates can only be discontinuously varied between available feed rates that are spaced apart adjacent each other, an improvement allowing a user of the machine to operate the machine at a desired overall feed rate intermediate available feed rates, comprising:

a user-variable means for selecting the overall feed rate desired; and a computer cooperating with the means and the pulse motor, the computer operating in a manner that when the means is adjusted to an overall rate corresponding to an available feed rate the computer causes the pulse motor to operate at said available feed rate, and when the means is adjusted to an overall rate corresponding to a rate intermediate two adjacent available feed rates the computer causes the pulse motor to operate in a repeated sequence, in which sequence the pulse motor is first operated at a one of said adjacent available feed rates and is subsequently operated at another of said adjacent available feed rates.

2. The improvement defined by claim 1, wherein the means includes a manually-operable variable resistance.

3. The improvement defined by claim 2, wherein the computer is a digital micro-computer and the means further includes an analog to digital converter connected to the variable resistance and the micro-computer.

* * * * *